(12) United States Patent
James et al.

(10) Patent No.: US 7,514,919 B2
(45) Date of Patent: Apr. 7, 2009

(54) SENSING APPARATUS AND METHOD

(75) Inventors: David Alun James, Harston (GB); Darran Kreit, Foxton (GB); Colin Stuart Sills, Cambridge (GB); Mark Anthony Howard, Worlington (GB)

(73) Assignee: TT Electronics Technology Limited (GB)

( * ) Notice: Subject to any disclaimer, the term of this patent is extended or adjusted under 35 U.S.C. 154(b) by 454 days.

(21) Appl. No.: 10/531,591

(22) PCT Filed: Oct. 15, 2003

(86) PCT No.: PCT/GB03/04457

§ 371 (c)(1),
(2), (4) Date: Nov. 18, 2005

(87) PCT Pub. No.: WO2004/036148

PCT Pub. Date: Apr. 29, 2004

(65) Prior Publication Data

US 2006/0119351 A1 Jun. 8, 2006

(30) Foreign Application Priority Data

Oct. 16, 2002 (GB) ................................. 0224100.8

(51) Int. Cl.
*G01N 27/72* (2006.01)
*G01R 33/12* (2006.01)
*H01F 5/00* (2006.01)

(52) U.S. Cl. ................... 324/239; 324/228; 324/207.17

(58) Field of Classification Search ............ 324/207.13, 324/207.15, 207.16, 207.17, 207.24, 207.25, 324/228, 239, 326–329

See application file for complete search history.

(56) References Cited

U.S. PATENT DOCUMENTS 3,275,938 A 9/1966 Carsello et al.

| | | | |
|---|---|---|---|
| 3,772,587 A | 11/1973 | Farrand et al. | |
| 3,789,393 A | 1/1974 | Tripp | |
| 3,819,025 A | 6/1974 | Fushida et al. | |
| 4,253,079 A | 2/1981 | Brosh | |

(Continued)

FOREIGN PATENT DOCUMENTS

DE 4230950 9/1993

(Continued)

OTHER PUBLICATIONS

Howard et al., "Sensing Position", Mar. 27, 2001, Publisher: Appliance Manufacturer.

(Continued)

*Primary Examiner*—Reena Aurora
*Assistant Examiner*—Kenneth J Whittington
(74) *Attorney, Agent, or Firm*—Fogg & Powers LLC

(57) ABSTRACT

A sensor for sensing a parameter such as position, comprises: (i) an excitation winding for example coils (7, 9) in quadrature; (ii) a signal generator (41, 42, 43) operable to generate an excitation signals and arranged to apply the generated excitation signal to the excitation winding; (iii) a sense coil (11) that can be electromagnetically coupled to the excitation winding such that, in response to the excitation signal being applied to the excitation winding by the signal generator, a periodic electric signal is generated in the sense coil that is indicative of the value of the parameter to be measured by the sensor; and (iv) a signal processor (108) operable to process the periodic electric signal generated in the sensor winding to determine a value representative of the parameter being measured. The signal processor may be arranged to generate a second signal ($f_1$) at a frequency slightly different from that of the excitation signal, and to mix the second signal with the signal received from the sense coil to generate a third signal having a frequency component ($f_0-f_1$) equal to the difference between the frequency of the excitation signal and that of the second signal. The processing unit then determines the parameter from the phase of the third signal.

29 Claims, 12 Drawing Sheets

U.S. PATENT DOCUMENTS

| | | | |
|---|---|---|---|
| 4,282,485 A | 8/1981 | Pauwels et al. | |
| 4,467,320 A | 8/1984 | McPhee | |
| 4,671,116 A | 6/1987 | Glennon et al. | |
| 4,697,144 A | 9/1987 | Howbrook | |
| 4,737,698 A | 4/1988 | McMullin et al. | |
| 4,793,302 A | 12/1988 | Osborne et al. | |
| 4,853,666 A | 8/1989 | Fesenmeier et al. | |
| 4,893,077 A | 1/1990 | Auchterlonie | |
| 4,893,078 A | 1/1990 | Auchterlonie | |
| 4,959,631 A | 9/1990 | Hasegawa et al. | |
| 4,970,450 A | 11/1990 | Karl et al. | |
| 5,023,408 A | 6/1991 | Murakami et al. | |
| 5,173,696 A | 12/1992 | Howard et al. | |
| 5,260,650 A | 11/1993 | Schwesig et al. | |
| 5,433,115 A | 7/1995 | Spillman, Jr. et al. | |
| 5,513,913 A | 5/1996 | Ball et al. | |
| 5,598,153 A | 1/1997 | Brasseur et al. | |
| 5,625,327 A | 4/1997 | Carroll et al. | |
| 5,646,496 A | 7/1997 | Woodland et al. | |
| 5,793,202 A | 8/1998 | Ikemoto | |
| 5,793,204 A | 8/1998 | Logue | |
| 5,796,250 A | 8/1998 | Dames | |
| 5,815,091 A * | 9/1998 | Dames et al. | 340/870.34 |
| 6,124,708 A | 9/2000 | Dames | |
| 6,239,571 B1 | 5/2001 | Shimahara | |
| 6,304,014 B1 | 10/2001 | England et al. | |
| 6,489,899 B1 | 12/2002 | Ely et al. | |
| 6,980,134 B2 * | 12/2005 | Ely et al. | 341/20 |
| 7,298,137 B2 * | 11/2007 | Howard et al. | 324/207.25 |

FOREIGN PATENT DOCUMENTS

| | | |
|---|---|---|
| EP | 0487730 | 6/1992 |
| EP | 0748054 | 12/1996 |
| EP | 0772025 | 5/1997 |
| EP | 1308697 | 5/2003 |
| GB | 2021273 | 11/1979 |
| GB | 2044461 | 10/1980 |
| GB | 2197078 | 5/1988 |
| GB | 2359139 | 8/2001 |
| GB | 2374424 | 10/2002 |
| JP | 57122311 | 7/1982 |
| JP | 59205821 | 11/1984 |
| JP | 63218819 | 9/1988 |
| SU | 1458946 | 2/1989 |
| WO | 9800921 | 1/1998 |
| WO | 9843046 | 10/1998 |
| WO | 9934171 | 7/1999 |
| WO | 9961868 | 12/1999 |
| WO | 0033244 | 6/2000 |
| WO | 0077480 | 12/2000 |
| WO | 0129759 | 4/2001 |
| WO | 0142865 | 6/2001 |
| WO | 02097374 | 12/2002 |
| WO | 03038379 | 5/2003 |
| WO | 03038380 | 5/2003 |

OTHER PUBLICATIONS

Howard, "Innovative Interfaces", Oct. 26, 2001, Publisher: Appliance Manufacturer.

Novacek, "Accurate Linear Measurement Using LVDTS", "Circuit Cellar the Computer Applications Journal", May 1, 1999, pp. 1-6, vol. 106, Publisher: Circuit Cellar.

* cited by examiner

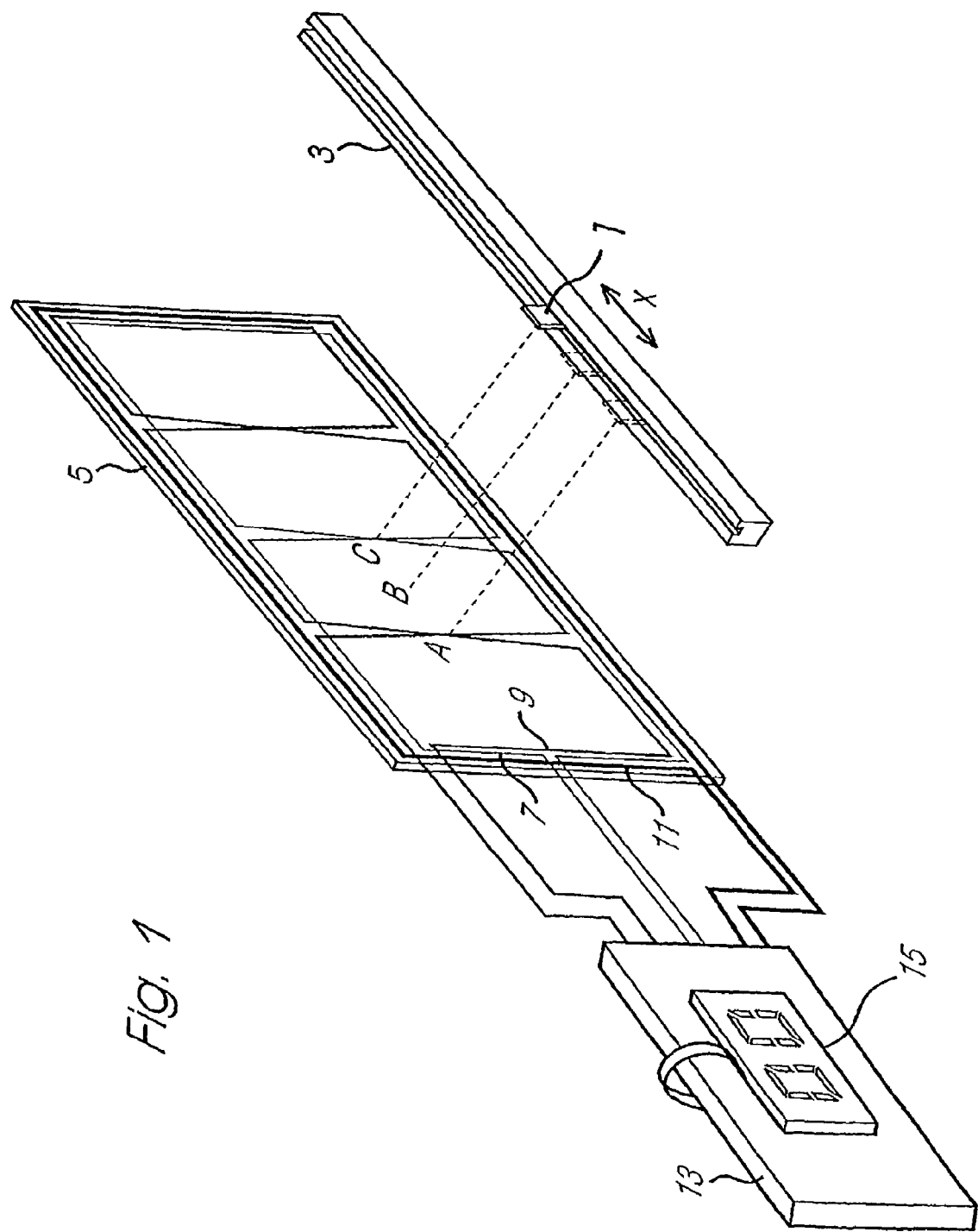

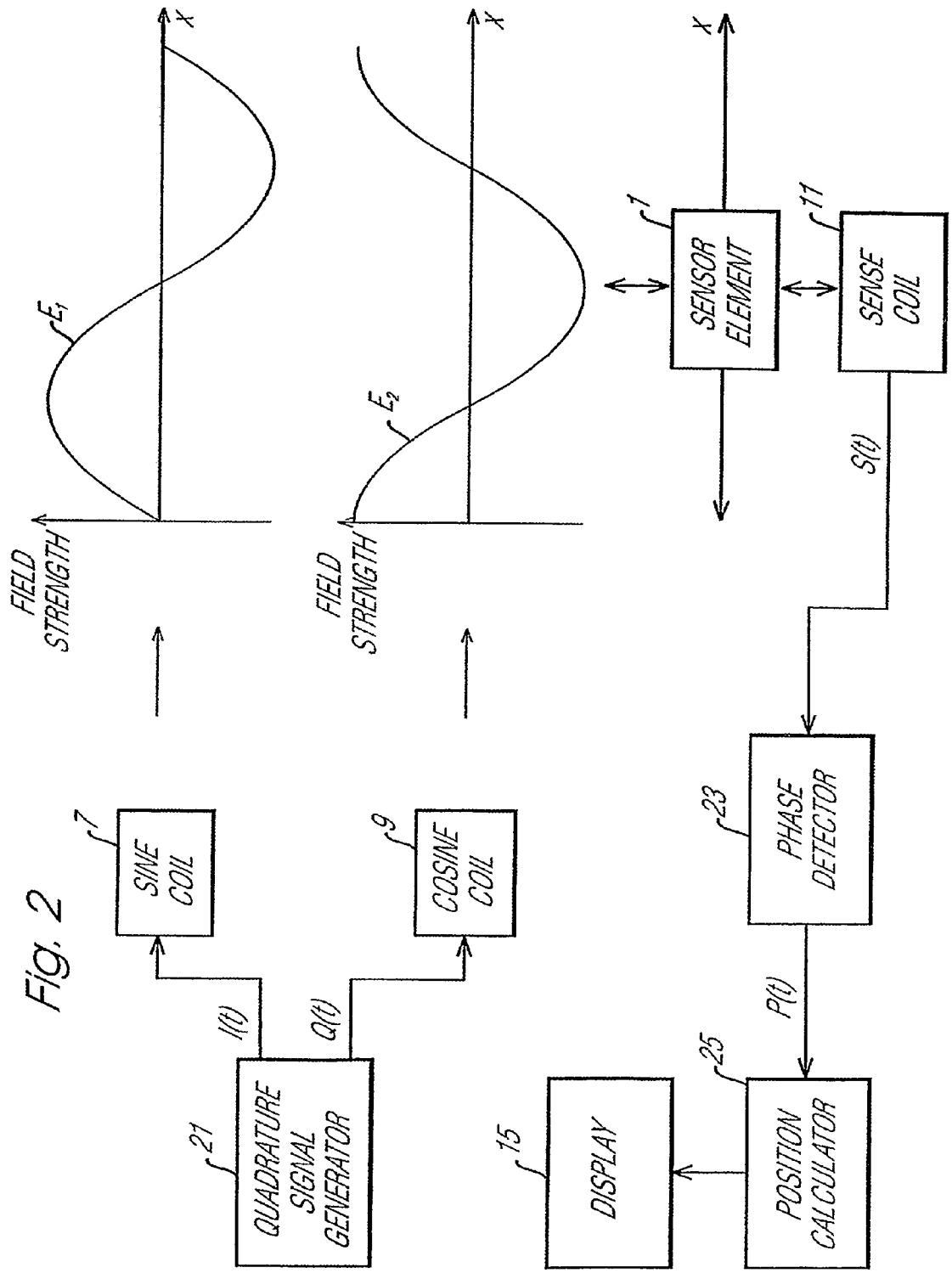

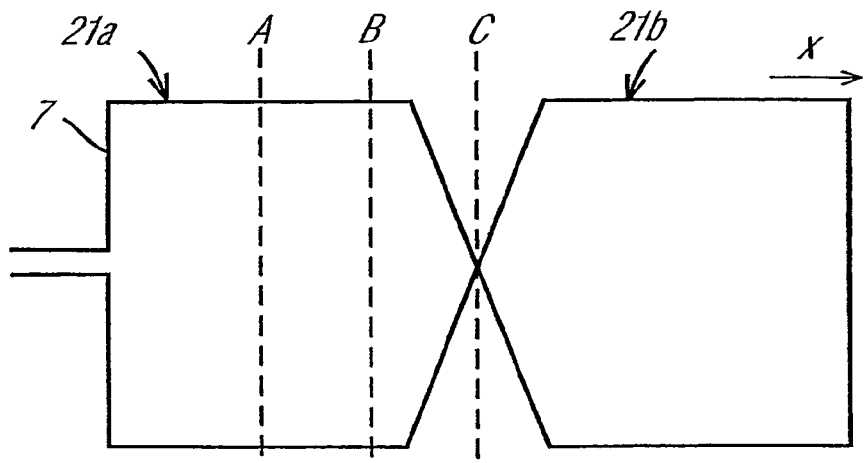
*Fig. 3A*
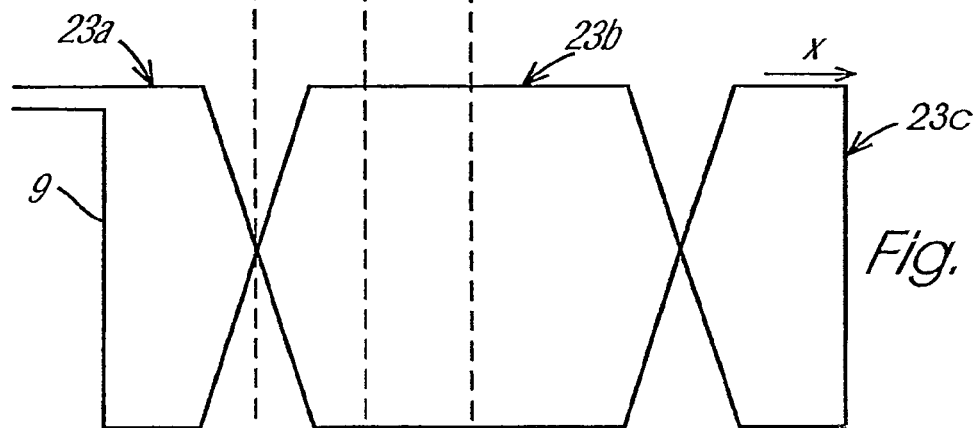
*Fig. 3B*
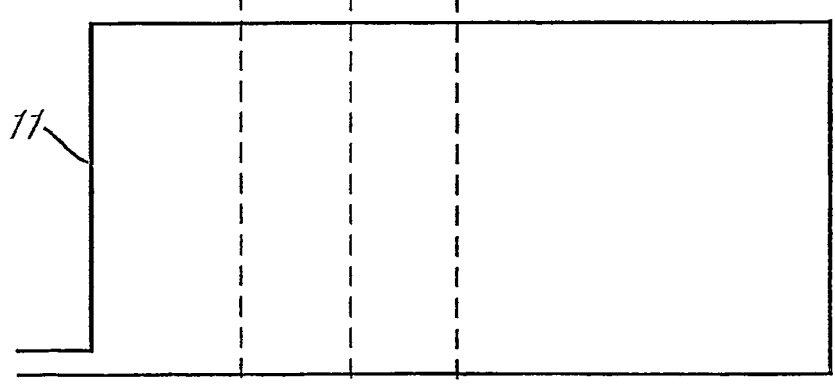
*Fig. 3C*
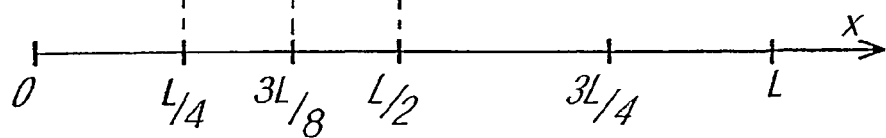

SENSING APPARATUS AND METHOD

This application claims priority to International Patent Application No. PCT/GB2003/004457 filed on Oct. 15, 2003, which claims priority to Great Britain Patent Application No. 0224100.8 filed on Oct. 16, 2002.

This invention relates to a sensing apparatus and to a method for sensing values of a parameter, especially, but not exclusively to measuring the position of an element.

This invention relates to a sensing apparatus and method which has particular, but not exclusive, relevance to a position sensor for sensing the relative position of two members.

Various forms of inductive sensor have been used to generate signals indicative of the position of two relatively movable members. Typically, one member carries an excitation winding and two or more sensor windings while the other member carries a resonant circuit. The magnetic coupling between the resonant circuit and each of the sensor windings varies with position so that, by applying an oscillating signal at the resonant frequency of the resonant circuit to the excitation winding, a signal is induced in each of the sensor windings which oscillates at the resonant frequency but whose amplitude varies as a function of the relative position of the two members.

One other form of inductive sensor is described in our co-pending international patent application No. PCT GB02/1204 in which the excitation signal comprises a carrier signal that is amplitude modulated by a lower frequency signal, and the signal induced in the sensor windings is demodulated in a signal processing unit in order to determine the position of the element. Such a system has the advantage that, because the carrier signal has a relatively high frequency, the signals induced on the sensor windings have a relatively large amplitude due to Faraday's law, while at the same time the demodulated signal has a low frequency, thereby allowing subsequent signal processing to be performed by relatively simple and inexpensive electronics. The excitation and sensor windings may be coupled by means of a resonator, typically a simple passive LC resonant circuit having a resonant frequency equal to the frequency of the carrier signal, which has the effect of amplifying the signal received by the sensor winding. Clearly the higher the quality factor Q of the resonant circuit, the greater the amplification of the signal received by the sensor winding.

However, this system suffers from the disadvantage that the measurement bandwidth is limited by the relatively low modulation frequency. The frequency spectrum of the modulated excitation signal will consist of a component at the carrier frequency together with two sidebands, one on either side of the carrier frequency and differing from the carrier frequency by the modulation frequency. If the modulation frequency of the excitation signals is increased, in order to increase the measurement bandwidth, the sidebands will move further away from the carrier band and out of resonance with the resonant circuit, thereby reducing the coupling of the excitation winding and the sensor winding. Accordingly there is a compromise between the modulation frequency of the excitation signal and measurement bandwidth on the one hand, and the quality factor of the resonant circuit and the coupling between the windings on the other hand. This compromise can be extremely problematic in systems incorporating many sensors that are controlled by a single set of electronics that hence share the available measurement bandwidth.

According to one aspect, the present invention provides a sensor for sensing a parameter, the sensor comprising:

(i) an excitation winding comprising a plurality of coils having different spatial functions;

(ii) a signal generator operable to generate excitation signals and arranged to apply the generated excitation signals to the excitation coils;

(iii) a sense coil that can be electromagnetically coupled to the excitation winding such that, in response to the excitation signal being applied to the excitation winding by the signal generator, there is generated in the sense coil a periodic electric signal having a phase that is indicative of the value of the parameter to be measured by the sensor; and (iv) a signal processor operable to process the periodic electric signal generated in the sense coil to determine a value representative of the parameter being measured;

wherein the signal processor is operable to generate a second signal at a frequency that differs from that of the excitation signal only by a small amount, and to mix the second signal with the signal received from the sense coil to generate a third signal having a frequency component equal to the difference between the frequency of the excitation signal and that of the second signal, and to determine the said value from the phase of the third signal.

According to another aspect, the present invention provides a method of sensing a parameter, the method comprising:

applying an excitation signal to an excitation winding; and processing a signal generated in a sensor winding which is electromagnetically coupled to the excitation winding in response to the application of the excitation signal to the excitation winding to determine a value representative of the parameter being measured;

the processing comprising generating a second signal at a frequency different from that of the excitation signal, mixing the second signal with the signal received from the sensor winding to generate as third signal having a low frequency component equal to the difference between the frequency of the excitation signal and that of the second signal, and determining the said value of the parameter from the phase of the third signal.

The sensor and the method according to the invention have the advantage that, because the excitation signal can be an unmodulated signal thereby having a single frequency component, a resonator having a relatively high quality factor can be employed in order to improve the electromagnetic coupling without reduction in the measurement bandwidth of the parameter to be determined.

Preferably, the signal is coupled between the excitation winding and the sense coil via an intermediate device that modifies the magnetic field generated by the excitation winding. The intermediate device may comprise any of a number of devices for example formed from high permeability materials, e.g. ferrites, or electrically conductive materials. Alternatively electrical devices may be used for example an active or passive band pass device (which for the sake of simplicity will be referred to hereinafter as a resonator). The resonator will preferably have a resonant frequency substantially equal to the frequency of the excitation signal. In this way, unwanted higher harmonics are effectively filtered out by the electromagnetic coupling between the excitation winding and the resonator. The resonator may have a relatively high quality factor, for example at least 5 and especially at least 10, the upper limit on the quality factor essentially being set by the ability to ensure a stable resonant frequency with respect to variations in the environment, e.g. temperature and humidity, and with respect to tolerances in the values of electrical parameters of the components.

It is necessary only for a single excitation winding and sensor winding to be present if a single parameter is to be measured, for example a position in one dimension. More than one excitation and/or sensor winding may, however, be employed, if desired. For example two such windings may be employed if the position of an element is to be measured in two dimensions, and three windings if a position is to be determined in three dimensions. Alternatively, the number of windings used for measurement of position in more than one dimension may be reduced if the amplitude of the signal is also employed.

The or each coil of the excitation winding may comprise a plurality of loops, for example two loops in the case of a sine coil of one wavelength, arranged so that current flowing through the coil flows around one loop of the coil in an opposite direction to the flow of current in the other loop. The excitation winding will normally comprise a plurality of coils (usually two) that have different spatial functions. In one embodiment, the or each excitation winding comprises a pair of coils that are arranged in space quadrature so that the same current flowing in each coil will produce magnetic fields in space quadrature relationship which is preferred in order to remove or reduce coupling between the coils. Thus, one coil of the or each excitation winding may be arranged to produce a magnetic field whose magnitude varies as the sine of the distance from a reference point, while the other coil of the or each excitation winding may be arranged to produce a magnetic field whose magnitude varies as the cosine of the distance from the reference point.

The excitation signal may comprise a pair of oscillating signals that are in time quadrature, each of which is applied to one of the coils. Because the signals are in time quadrature, and the two coils are in space quadrature, the two signals form a composite magnetic field that rotates, both in time and with respect to position along the loops. The resonator will induce a signal in the sensor winding whose phase varies with the position of the resonator along the excitation winding.

The signal induced in the sensor winding may be mixed with a second signal at a different frequency from that of the signal applied to the excitation winding, preferably differing from the frequency of the excitation signal only by a small amount, for example not more than 30%, and especially not more than 10% of the excitation signal frequency, in order to form a third signal having frequency components equal to the sum and the difference of the frequencies of the excitation signal and the second signal. The resulting signal which contains the "beats" can be filtered to remove components with high frequencies and to leave only the low frequency component for example having a frequency of at least 100 Hz and especially in the range of 100 Hz to 100 KHz, and whose phase shift is proportional to the position of the resonator. This signal can be passed to a comparator in order to generate a square wave signal, and the cross-over points determined. The signal processor can generate a reference signal at the same frequency as the beat frequency of the sensed signal in order to provide a fixed phase reference, and the phase difference between the sensed signal and the reference signal will provide an indication of the position of the resonator.

If desired it is possible to generate an excitation signal periodically that has a frequency different from the resonant frequency of the resonator. This will enable background noise picked up by the sensor coil to be determined and taken into account.

The terms "sine" and "cosine" as used herein are not intended to be interpreted as strictly trigonometrical functions, but are intended to include all complementary functions that are in quadrature relationship to each other. For example, the waveforms employed with the excitation coils may be digital signals, for example square wave signals, that are produced directly from a digital signal generator (after amplification where necessary).

One form of position sensor in accordance with the present invention will now be described by way of example with reference to the accompanying drawings, in which:

FIG. 1 schematically shows a perspective view of a position sensor;

FIG. 2 schematically shows the main components of the position sensor illustrated in FIG. 1;

FIG. 3A shows the lay-out of a sine coil which forms part of the position sensor illustrated in FIG. 1;

FIG. 3B shows the lay-out of a cosine coil which forms part of the position sensor shown in FIG. 1;

FIG. 3C shows the lay-out of a sense coil which forms part of the position sensor illustrated in FIG. 1;

Figure 4:
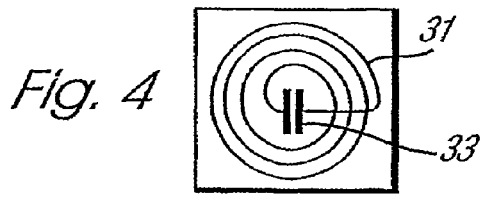
FIG. 4 shows a sensor element which forms part of the position sensor illustrated in FIG. 1.
Figure 5A:
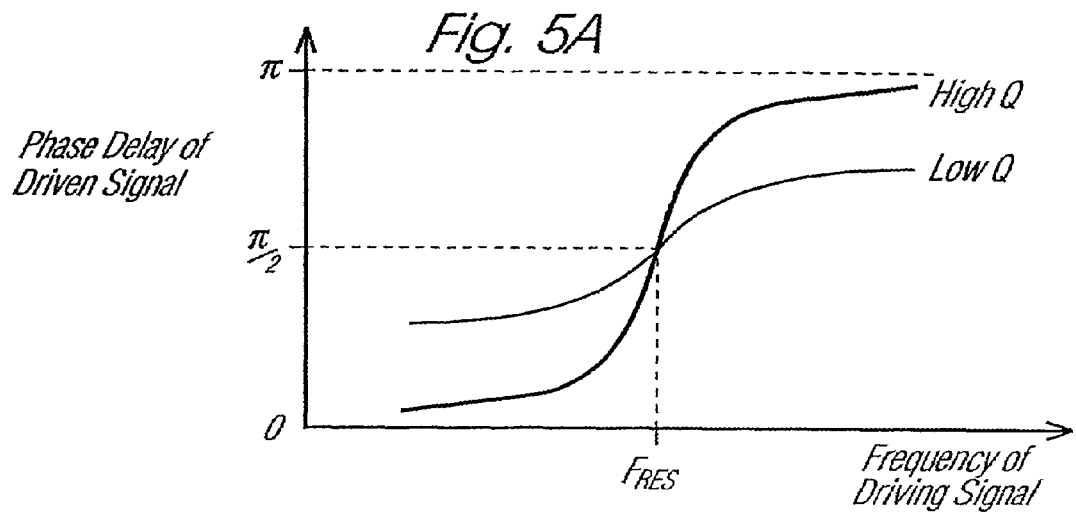
Figure 5B:
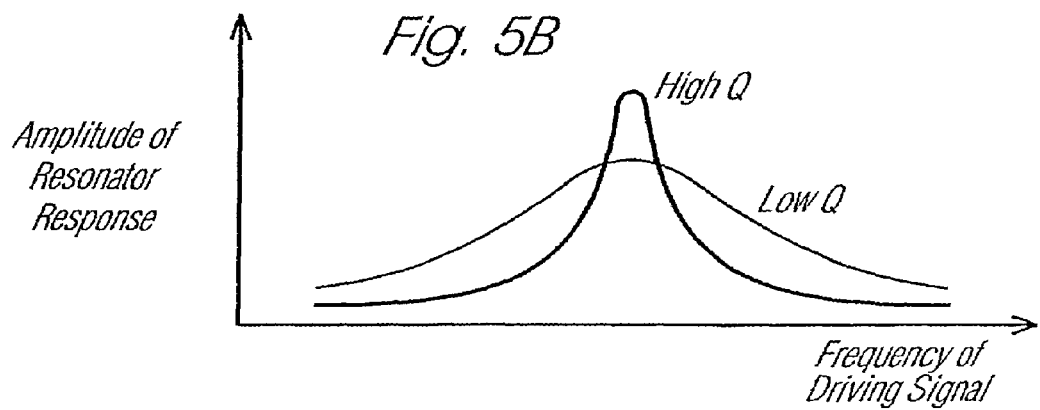
Figure 5C:
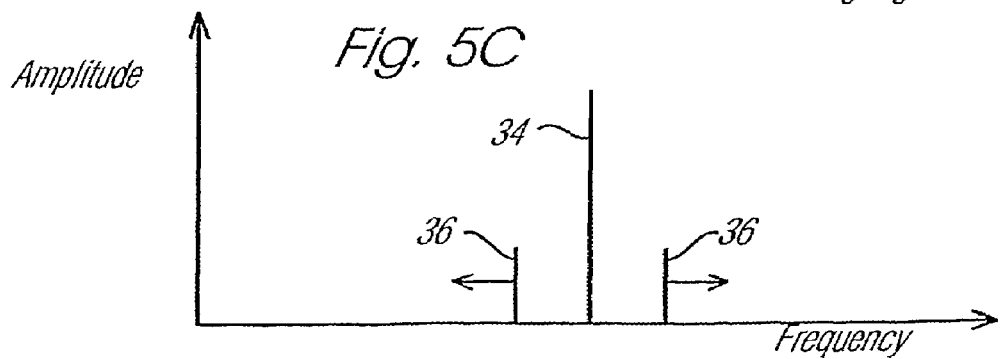
Figure 6:
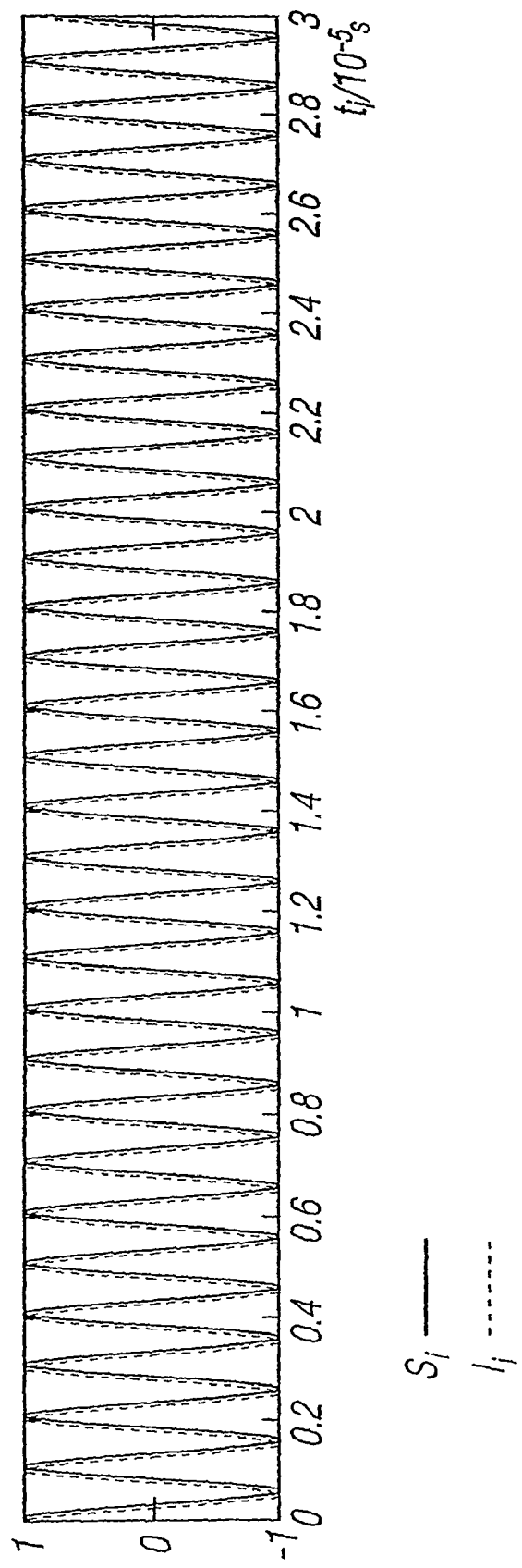
Figure 7:
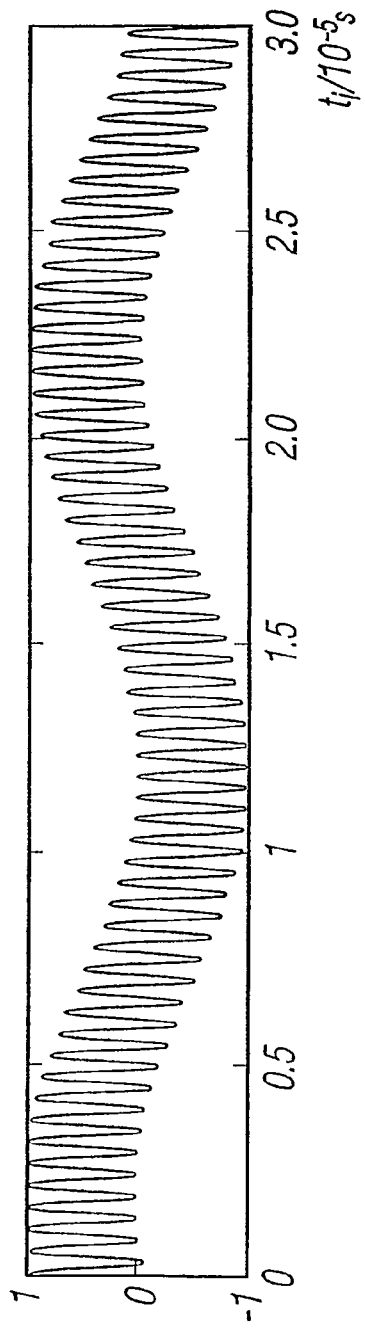
Figure 8:
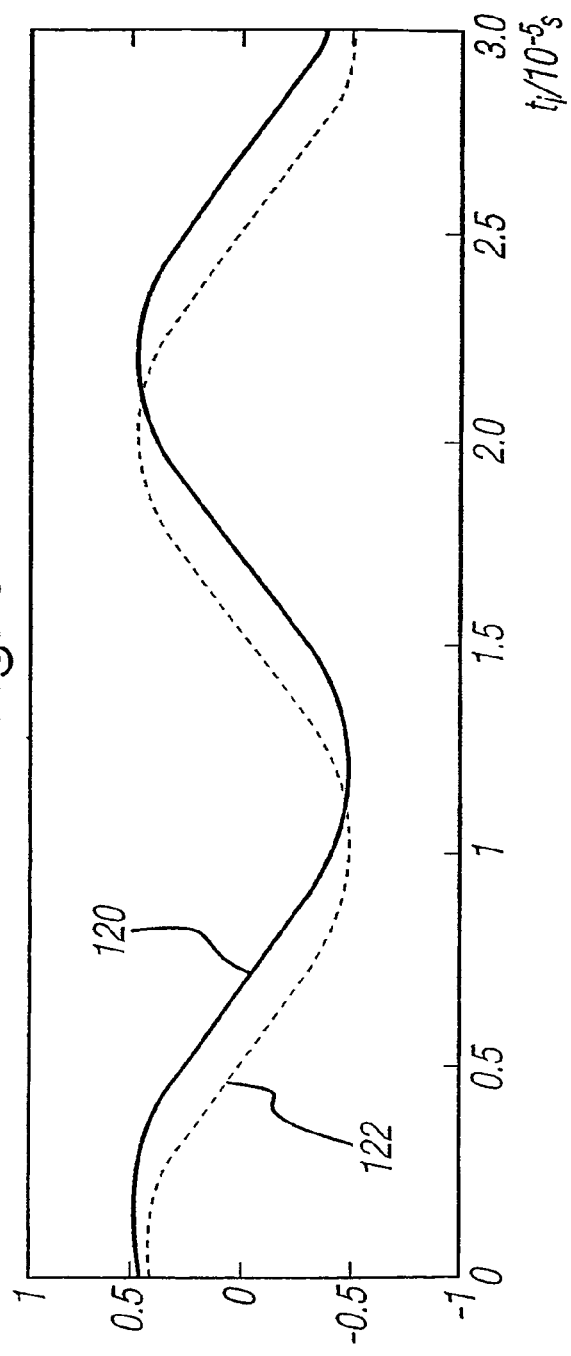
Figure 9:
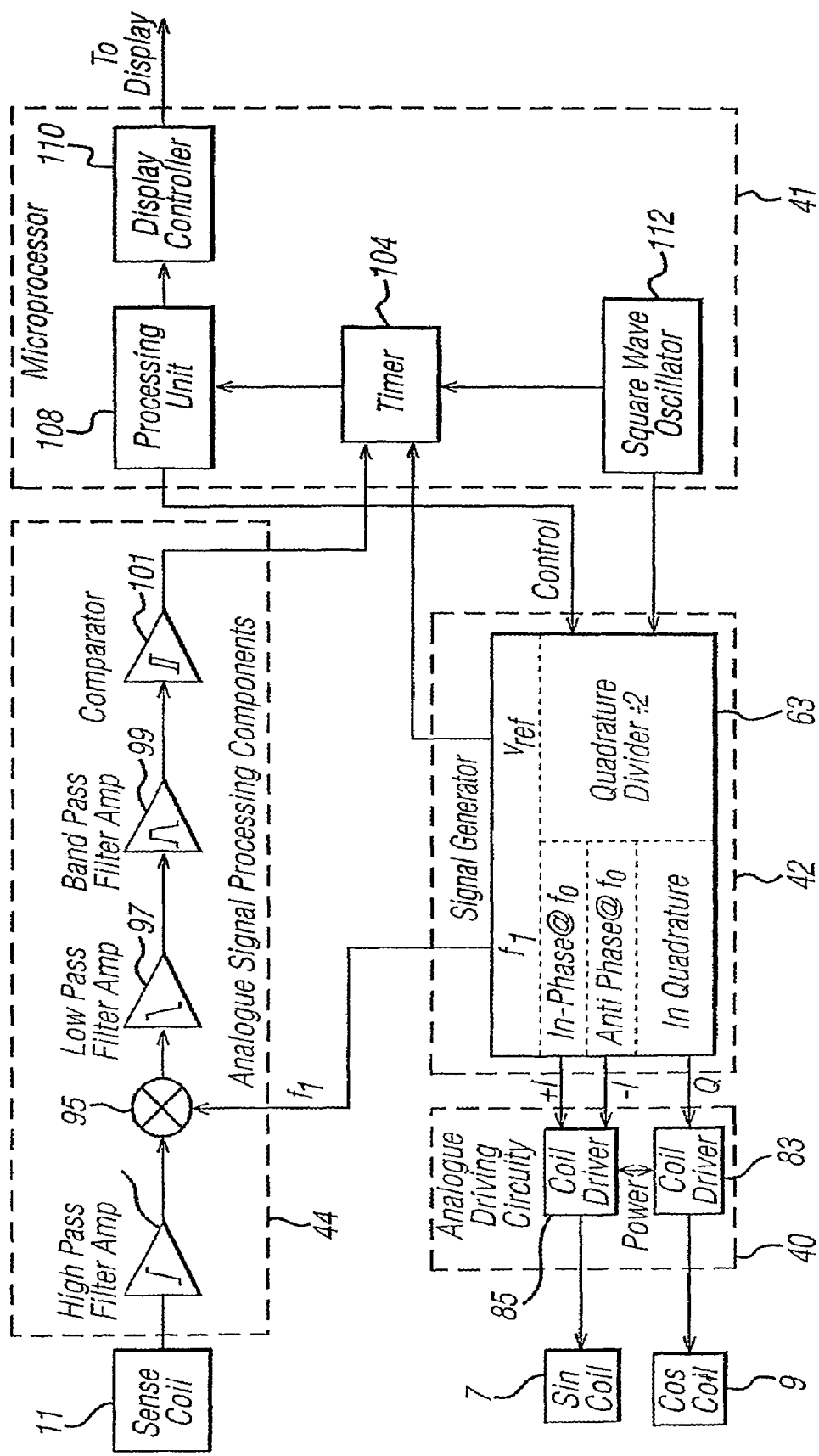
Figure 10:
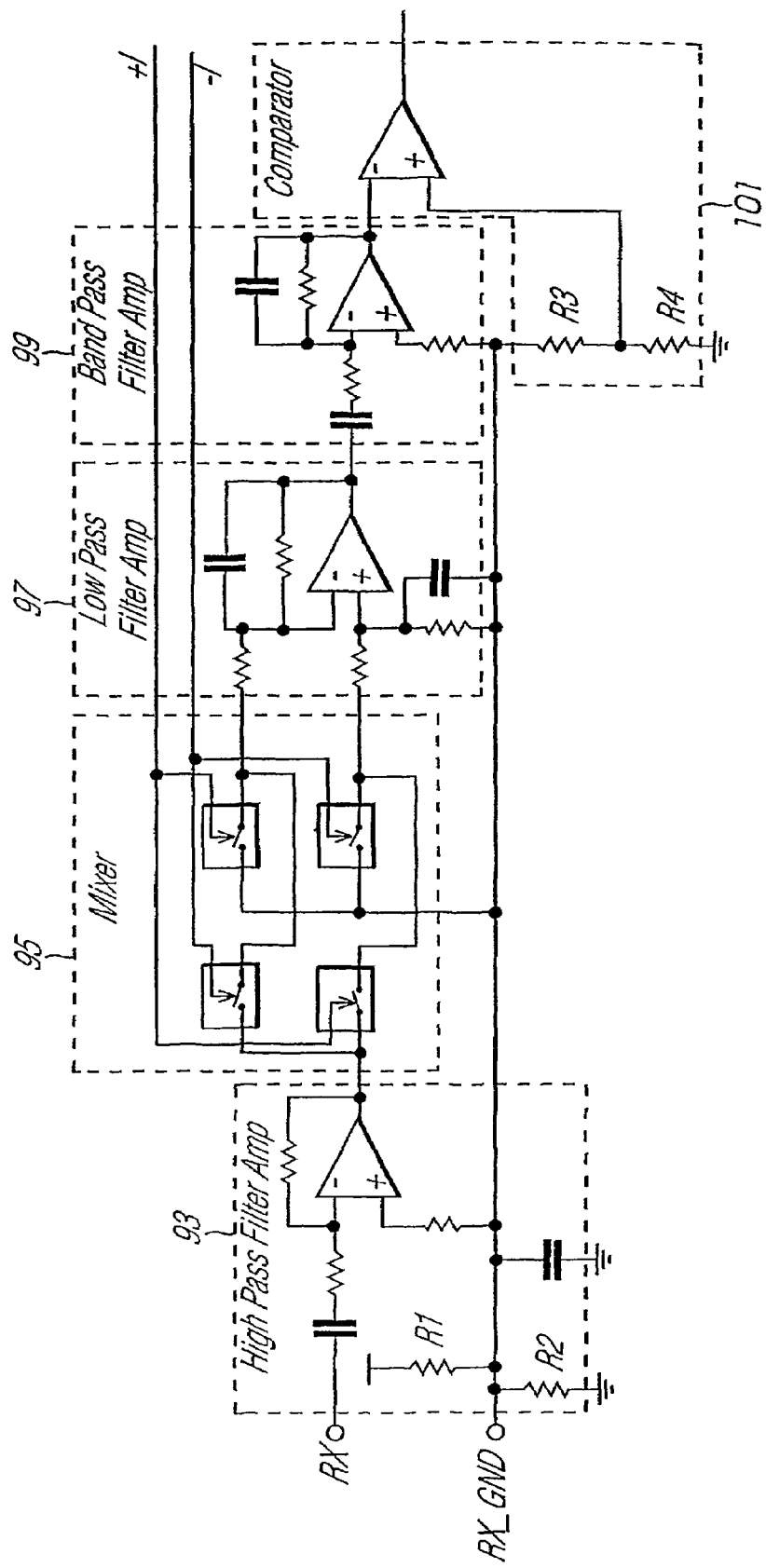
Figure 12:
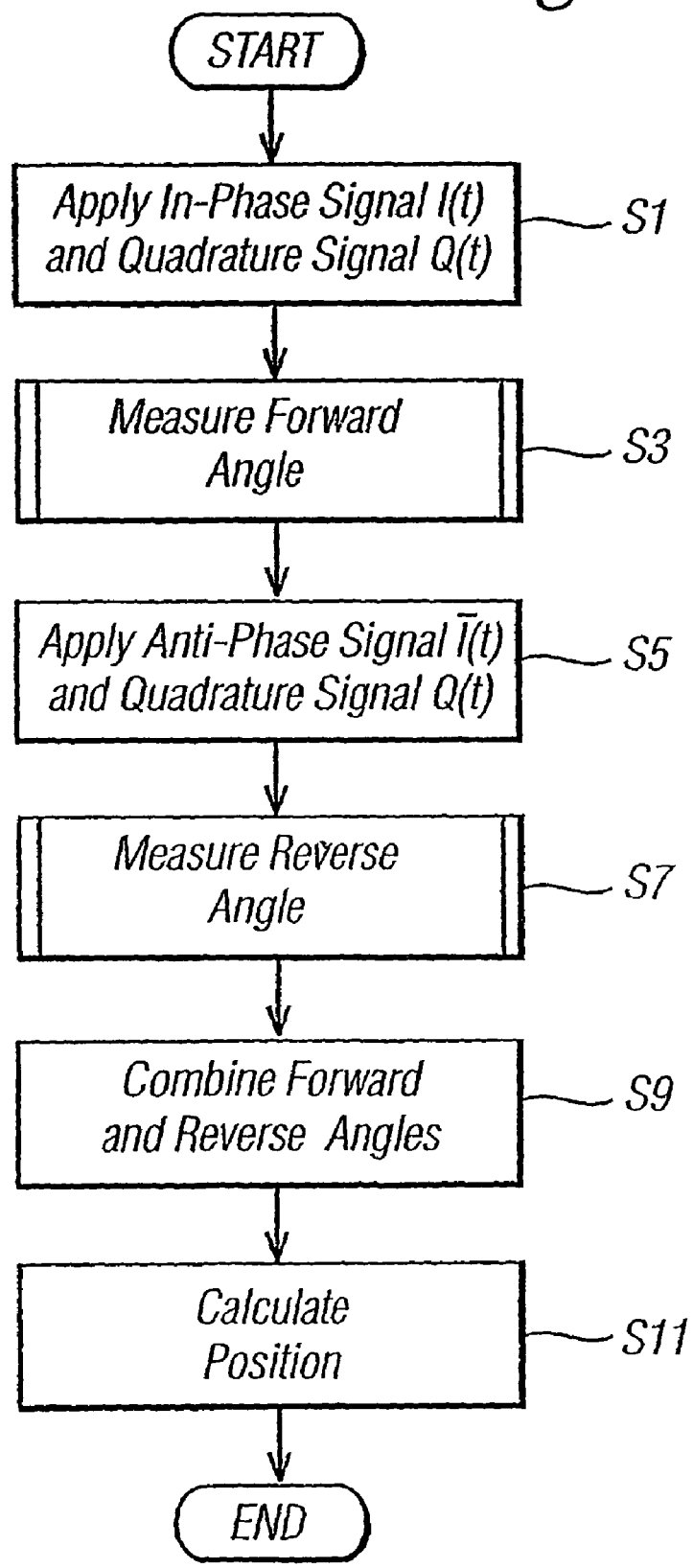
Figure 13:
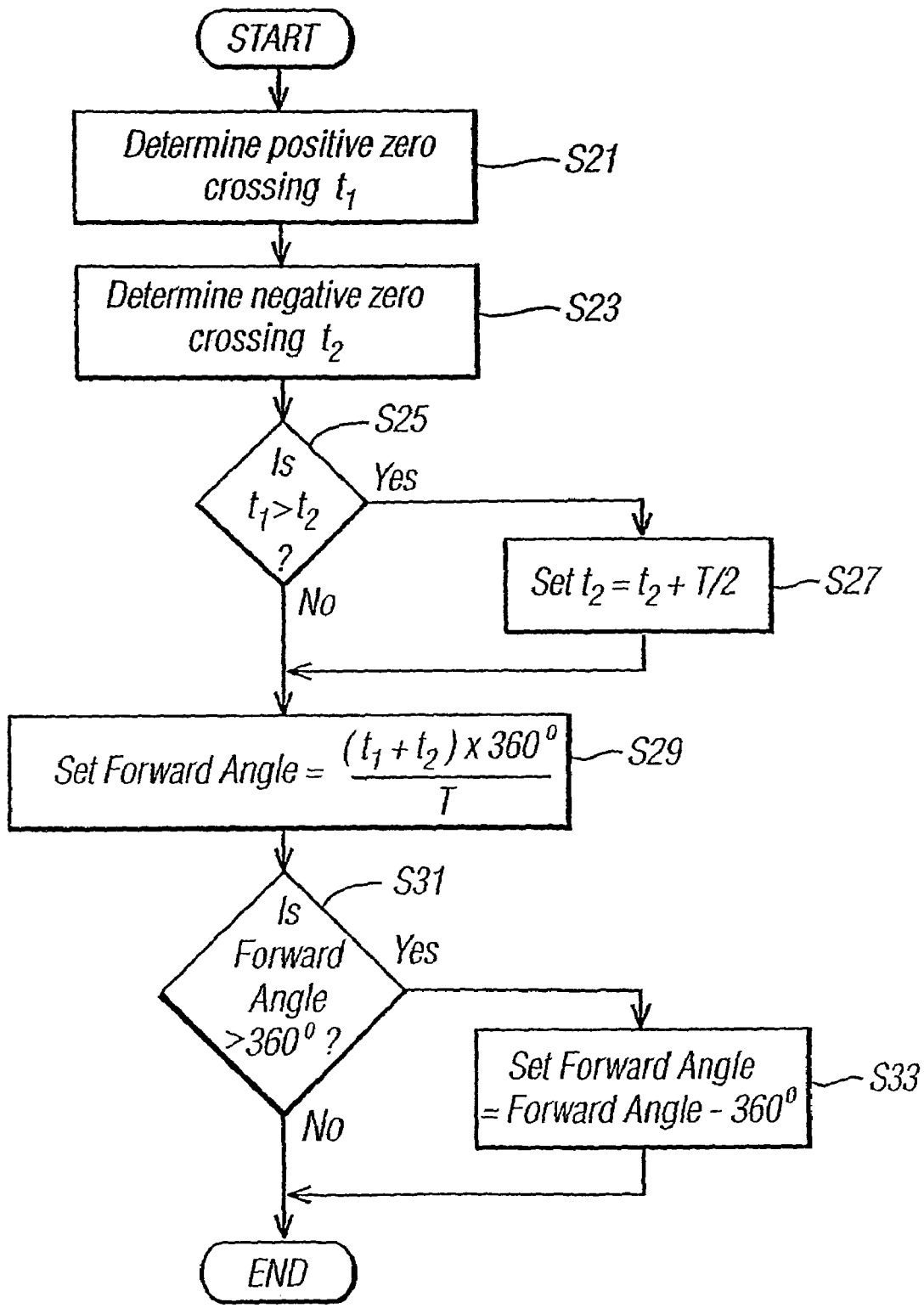
Figure 14:
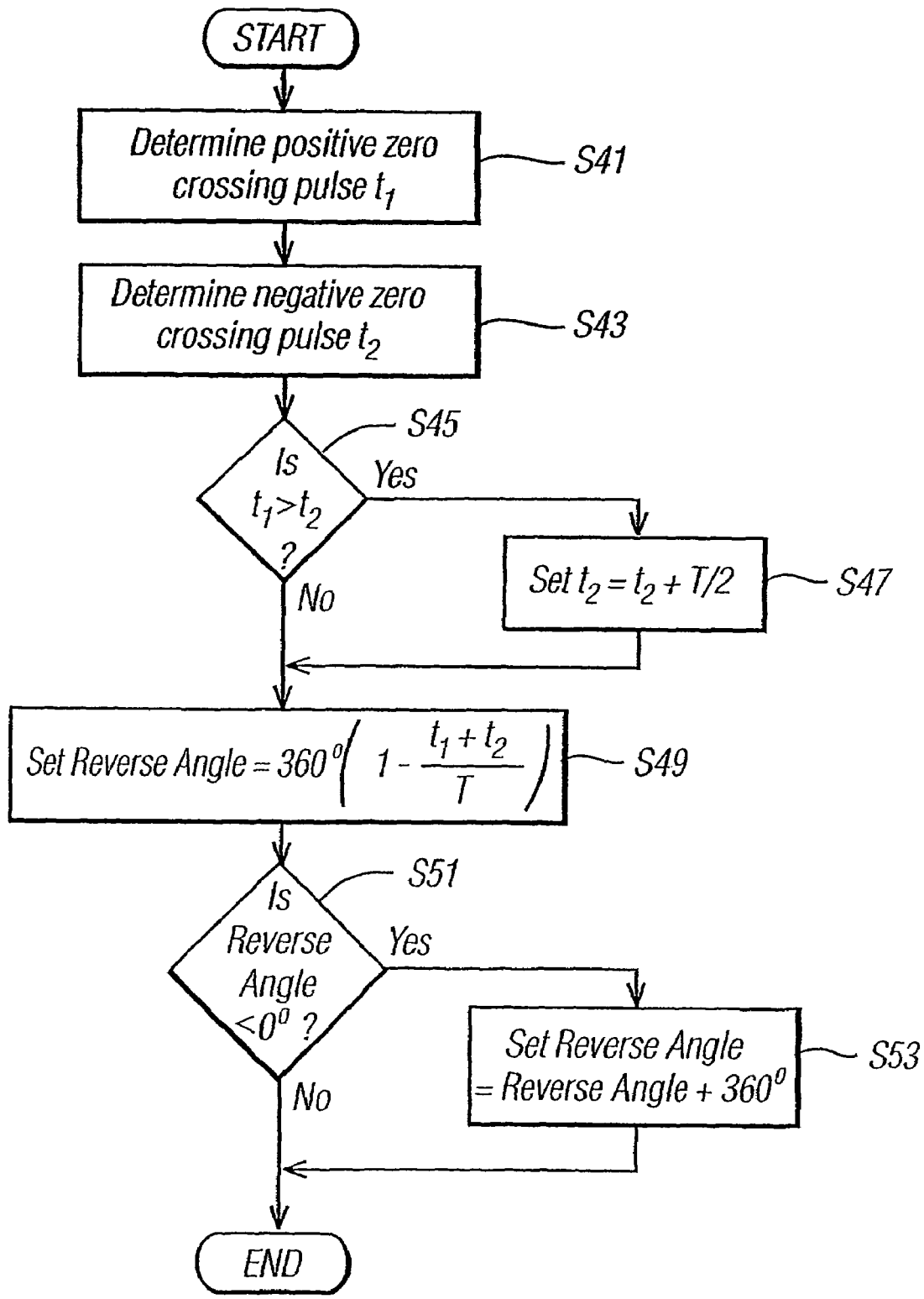

FIG. 5A schematically shows how the phase of a signal induced in a resonant circuit which forms part of the sensor element shown in FIG. 4 varies with the frequency of a driving signal;

FIG. 5B schematically shows how the amplitude of a signal induced in the resonant circuit which forms part of the sensor element illustrated in FIG. 4 varies with the frequency of the driving signal;

FIG. 5C is a schematic representation, on the same scale as FIG. 5B, of the frequency bands of an amplitude modulated carrier signal that may be employed in application No. PCT GB02/1204;

FIG. 6 shows an unmodulated signal and a sensed signal generated by a sensor according to the invention FIG. 7 shows part of a signal that is sensed by the sensor coil in the sensor according to the invention after mixing with a second frequency;

FIG. 8 shows part of the signal shown in FIG. 7 after filtering, together with a reference signal;

FIG. 9 is a schematic block diagram showing the main elements of the sensor according to the present invention;

FIG. 10 is a diagram showing part of the circuit of FIG. 9 in greater detail;

FIG. 11A-D are timing diagrams showing various signals within the processing circuitry of FIG. 9;

FIG. 12 is a flow chart showing the operations performed to calculate the position of the sensor element of the position sensor illustrated in FIG. 1;

FIG. 13 is a flow chart showing in more detail the operations performed to calculate a forward angle used to calculate the position of the sensor element of the position sensor illustrated in FIG. 1; and FIG. 14 is a flow chart showing in more detail the operations performed to calculate a reverse angle used to calculate the position of the sensor element of the position sensor illustrated in FIG. 1.

FIG. 1 schematically shows a position sensor for detecting the position of a sensor element 1 which is slidably mounted to a support 3 to allow linear movement along a measurement direction (the direction X in FIG. 1). A printed circuit board (PCB) 5 extends along the measurement direction adjacent to the support 3 and has printed thereon conductive tracks which form a sine coil 7, a cosine coil 9 and a sense coil 11, each of which are connected to a control unit 13. A display 15 is also connected to the control unit 13 for displaying a number representative of the position of the sensor element 1 along the support 3.

As shown in FIG. 1, the PCB 5 is generally rectangular in shape with the lengthwise axis aligned with the measurement direction and the widthwise axis aligned perpendicular to the measurement direction. The sine coil 7, cosine coil 9 and sense coil 11 are connected to the control unit via a lengthwise edge of the PCB 5, which corresponds to the position value of x equals zero, with the position value increasing along the length of the PCB 5 from the lengthwise edge corresponding to x equals zero.

An overview of the operation of the position sensor illustrated in FIG. 1 will now be given with reference to FIG. 2. The control unit 13 includes a quadrature signal generator 21 which generates an in-phase signal I(t) and a quadrature signal Q(t) at respective different outputs. The in-phase signal I(t) is an oscillating signal having a frequency $f_0$, which in this embodiment is 1 MHz.

Similarly, the quadrature signal Q(t) is an oscillating signal having frequency $f_0$ the second signal being $\pi/2$ radians (90°) out of phase with the first signal.

The in-phase signal I(t) is applied to the sine coil 7 and the quadrature signal Q(t) is applied to the cosine coil 9.

The sine coil 7 is formed in a pattern which causes current flowing through the sine coil 7 to produce a first magnetic field $B_1$ whose field strength component resolved perpendicular to the PCB 5 varies sinusoidally along the measurement direction in accordance with the function:

$$B_1 = B \sin(2\pi x/L) \quad (1)$$

where L is the period of the sine coil in the x direction.

Similarly, the cosine coil 9 is formed in a pattern which causes current flowing through the cosine coil 9 to produce a second magnetic field $B_2$ whose field strength component resolved perpendicular to the PCB 5 also varies sinusoidally along the measurement direction, but with a phase difference of $\pi/2$ radians (90°) from the phase of the first magnetic field $B_1$, giving:

$$B_2 = B \cos(2\pi x/L) \quad (2)$$

In this way, the total magnetic field $B_T$ generated at any position along the measurement direction will be formed by a first component from the first magnetic field $B_1$ and a second component from the second magnetic field $B_2$, with the magnitudes of the first and second components resolved perpendicular to the PCB 5 varying along the measurement direction.

If an in-phase oscillating signal I(t) is applied to the sine coil 7 at angular frequency $\omega_o (=2\pi f_0)$ and an oscillating signal Q(t) at the same frequency and in quadrature relationship to it is applied to the cosine coil 9, the component of the resulting composite field resolved perpendicular to the PCB 5 produced by the excitation winding will therefore have a magnitude of the form:

$$\sin(\omega_o t)\sin(2\pi x/L) + \cos(\omega_o t)\cos(2\pi x/L) = \cos(\omega_o t - 2\pi x/L) \quad (3)$$

The composite signal will, in effect, produce a magnetic field whose direction appears to rotate both with respect to time and with respect to position along the excitation winding.

In this embodiment, the sensor element 1 includes a resonant circuit having a resonant frequency substantially equal to the frequency $f_0$. The total magnetic field component BT therefore induces an electric signal in the resonant circuit which oscillates at the carrier frequency $f_0$ with a phase which is dependent upon the position of the sensor element 1 along the measurement direction. The electric signal induced in the resonant circuit in turn generates a magnetic field which induces a sensed electric signal S(t) in the sense coil 11.

The separate components of the position sensor shown in FIG. 1 will now be discussed in more detail.

As shown in FIG. 3A, the sine coil 7 is formed by a conductive track which generally extends around the periphery of the PCB 5 apart from a cross-over point halfway along the PCB 5 in the measurement direction, at which the conductive track on each widthwise edge of the PCB 5 crosses to the corresponding opposing widthwise edge of the PCB 5. In this way, effectively a first current loop 21a and a second current loop 21b are formed. When a signal is applied to the sine coil 7, current flows around the first current loop 21a and the second current loop 21b in opposite directions, and therefore the current flowing around the first current loop 21a generates a magnetic field which has an opposite polarity to the magnetic field generated by current flowing around the second current loop 21b. This results in the sinusoidal variation of the field strength of the component of the first magnetic field $B_1$ resolved perpendicular to the PCB 5 given by equation 1 above.

In particular, the lay-out of the sine coil 7 is such that the field strength of the component of the first magnetic field $B_1$ resolved perpendicular to the PCB 5 which is generated by current flowing through the sine coil 7 varies along the measurement direction from approximately zero at the point where x equals 0, to a maximum value at x equals L/4 (the position A as shown in FIG. 3A), then back to zero at x equals L/2 (the position C as shown in FIG. 3A), then to a maximum value (having opposite polarity to the maximum value at position A) at x equals 3L/4, and then back to zero at x equals L. Thus the sine coil 7 generates a magnetic field component perpendicular to the PCB 5 which varies according to one period of the sine function.

As shown in FIG. 3B, the cosine coil 9 is formed by a conductive track which generally extends around the periphery of the PCB 5 apart from two cross-over points, located one-quarter and three-quarters of the way along the PCB 5 in the measurement direction respectively. In this way, three loops 23a, 23b and 23c are formed of which the outer loops 23a and 23c are half the size of the inner loop 23b. When a signal is applied to the cosine coil 9, current flows in one direction around the outer loops 23a and 23c and in the opposite direction around the inner loop 23b. In this way, the magnetic field generated by the current flowing around the inner loop 23b has an opposite polarity to the magnetic field generated by the current flowing around the outer loops 23a and 23c. This results in the cosinusoidal variation of the field strength of the component of the second magnetic field $B_2$ resolved perpendicular to the PCB 5 given by equation 2 above.

In particular, the lay-out of the cosine coil 9 is such that the field strength of the component of the second magnetic field $B_2$ resolved perpendicular to the PCB 5 which is generated by current flowing through the cosine coil 9 varies along the measurement direction from a maximum value at x equals 0, to zero at x equals L/4 (the position A as shown in FIG. 3B), then back to a maximum value (having opposite polarity to the maximum value at x equals 0) at x equals L/2 (the position C as shown in FIG. 3B), and then back to zero at x equals 3L/4, and then back to a maximum value (having the same polarity as the maximum value at x equals 0) at x equals L. Thus, the cosine coil 7 generates a magnetic field component perpendicular to the PCB 5 which varies according to one period of the cosine function.

As shown in FIG. 3C, the sense coil 11 is formed by a conductive track which generally extends around the periphery of the PCB 5 forming a single loop.

The layout of the sine coil 7 is such that the electric current induced in the sense coil 11 by current flowing around the first current loop 21a is substantially cancelled out by the electric current induced in the sense coil 11 by current flowing around the second current loop 21b. Similarly, for the cosine coil 9 the current induced in the sense coil 11 by the outer loops 23a, 23c is cancelled out by the current induced in the sense coil 11 by the inner loop 23b. Using such balanced coils has the further advantage that the electromagnetic emissions from the sine coil 7 and the cosine coil 9 diminish with distance at a faster rate than for a single planar winding. This allows larger drive signals to be used while still satisfying regulatory requirements for electromagnetic emissions. This is particularly important because the regulatory requirements for electromagnetic emissions are becoming stricter and stricter.

FIG. 4 shows in more detail the sensor element 1. As shown, in this embodiment the sensor element 1 includes a coil 31 whose ends are connected together via a capacitor 33. As the coil 31 has an associated inductance, the coil 31 and capacitor 33 together form a resonant circuit. In this embodiment, the resonant circuit has a nominal resonant frequency $f_{res}$ of 1 MHz (which is equal to the carrier frequency $f_0$) although the actual resonant frequency will vary in accordance with environmental factors such as temperature and humidity.

As described above, when an oscillating drive signal is applied to one or both of the sine coil 7 and the cosine coil 9, an oscillating signal at the same frequency is induced in the resonant circuit of the sensor element 1. However, a phase lag occurs between the drive signal and the induced signal, the amount of the phase lag being dependent upon the relationship between the frequency of the drive signal and the resonant frequency of the resonant circuit. As shown in FIG. 5A, the phase lag varies most quickly around the resonant frequency of the resonant circuit, with the phase lag at the resonant frequency being $\pi/2$ radians (90°). The higher the quality factor of the resonant circuit, the more quickly the phase varies around the resonant frequency. However, as shown in FIG. 5B, the higher the quality factor of the resonant circuit, the narrower the frequency band at which the resonator will amplify the signal.

As described above, assuming no phase shift is introduced by the resonant circuit, for each position x in the measurement direction a position-related phase shift $\phi(x)$ is introduced when the in-phase signal I(t) and the quadrature signal Q(t) are applied, and a position-related phase shift $-\phi(x)$ is introduced when the anti-phase signal $-I(t)$ and the quadrature signal Q(t) are applied. In practice, the resonant circuit does introduce a phase shift $\phi_{RC}$, but the phase shift $\phi_{RC}$ is generally the same whether the in-phase signal I(t) or the anti-phase signal $-I(t)$ is applied to the sine coil 7. This also applies to other phase shifts introduced by the processing electronics. Therefore, in this embodiment the phase shift measured when applying the anti-phase signal $-I(t)$ is subtracted from the phase shift measured when applying the in-phase signal I(t), resulting in the phase shift $\phi_{RC}$ introduced by the resonant circuit being cancelled to give a resultant phase which is equal to twice the position-dependent phase shift $\phi(x)$.

As shown in FIG. 5C, the frequency spectrum of an amplitude modulated excitation signal as employed in co-pending international patent application No. PCT GB02/01204 comprises a peak 34 at the carrier frequency of the excitation signal, and a sideband 36 on either side of the carrier frequency peak 34 separated from it by a value equal to the frequency of the modulating signal. It is the sidebands 36 which contain information relating to the position of the resonator. If the modulating frequency of the excitation signal is increased in order to improve the measurement bandwidth of the measurement, the position of sidebands 36 will move away from the carrier band 34 as shown by the arrows, with the result that the sidebands will no longer lie in the passband of a high Q resonator. Accordingly, with an amplitude modulated excitation signal, it is always necessary to strike a compromise between the quality factor of the resonator and the modulation frequency of the excitation signal.

The principle of operation of an inductive position sensor that overcomes the drawbacks of the sensor referred to above will now be described with reference to FIGS. 6 to 10.

FIG. 6 shows an unmodulated signal 200 at a frequency of 1 MHz which is sufficiently high to generate a relatively large response from the resonator. The figure also shows a signal 201 which is sensed by the sense coil 11 and which has a small phase delay with respect to the original signal in this case 0.1 µs. At a frequency of 1 MHz the phase delay will always be 1 µs or less, with the result that, in order to determine the position of the resonator accurately, it is necessary to resolve the phase delay to a value of 1 to 10 ns, which is relatively difficult. If however, the sensed signal is mixed with a second signal of slightly lower or higher frequency, a signal as shown in FIG. 7 is generated which contains a signal at a frequency higher than the original signal, together with the original 1 MHz signal together with a lower frequency signal having "beats" at a frequency equal to the frequency difference between the sensed signal and the second signal. This signal can be filtered to remove the high frequency signal and other signals and leave the beat sinusoidal signal 120 as shown in FIG. 8. The signal 120 has a phase delay that is related to the position of the resonator so that it may be compared with a reference signal 122 of the same frequency to determine the position of the resonator. It can be seen from FIG. 8, the phase delay of the resulting beat signal corresponds to much longer times with the result that relatively inexpensive circuitry can be employed.

FIG. 9 shows schematically a position sensor which comprises a microprocessor 41, excitation signal generator 42, for generating signals that are sent via the analogue drivers 40 to the sin coil 7 and the cos coil 9, and a signal processor 44 for signals received by the sense coil 11.

The microprocessor 41 includes a first square wave oscillator 112 which generates a square wave signal at twice the frequency $f_0$ (i.e. at 2 MHz). This square wave signal is output from the microprocessor 41 to a quadrature divider unit 63 which divides the square wave signal by 2 and forms an in-phase digital signal +1 at the frequency $f_0$, an anti-phase digital signal $-I$ at the same frequency and a quadrature digital signal +Q, also at the same frequency.

The quadrature signal at frequency $f_0$ is then sent to an analogue coil driver circuit 83 where it is amplified, and the amplified signal is output to the cos coil 9. Similarly, the in-phase or anti-phase signal +I or $-I$ is sent to an analogue coil driver circuit 85 where they are amplified and output to the sine coil 7.

The digital generation of the drive signals applied to the sine coil 7 and the cosine coil 9 introduces high frequency harmonic noise. However, the coil drivers 83, 85 remove some of this high frequency harmonic noise, as do the frequency response characteristics of the cosine and sine coils 7, 9. Furthermore, the resonant circuit within the sensor element 1 will not respond to signals which are greatly above the resonant frequency and therefore the resonant circuit will also filter out a portion of the unwanted high frequency harmonic noise.

As discussed above, the signals applied to the sine coil 7 and the cosine coil 9 induce an electric signal in the resonant circuit of the sensor element 1 which in turn induces the sensed signal S(t) in the sense coil 11 which will be of the form:

$$\cos(\omega_0 t - 2\pi x/L) \qquad (3)$$

The sensed signal S(t) is passed through a high pass filter amplifier 93 which both amplifies the received signal, and removes low frequency noise (e.g. from a 50 hertz mains electricity supply) and any D.C. offset. The amplified signal is then input to a mixer 95, where the amplified signal is mixed with a signal at a second frequency $f_1$. The second signal of frequency $f_1$ may be a sinusoidal signal or a digital signal having sinusoidal characteristics, and may be generated by a digital component associated with the quadrature divider 63, or may be generated indirectly from the square wave oscillator 112. What is important is that the second signal $f_1$ has a fundamental frequency somewhat higher or lower than that of the original signals at frequency $f_0$ so that the mixed signal will include components at frequencies $f_0+f_1$ and at $f_0-f_1$. This signal comprises a sinusoidal signal at frequency $f_0-f_1$ superimposed on a low frequency sinusoidal signal at frequency $f_0-f_1$. The general form of the signal can be represented as:

$$\cos((\omega_0+\omega_1)t - 2\pi x/L) + \cos((\omega_0-\omega_1)t - 2\pi x/L)$$

This signal is then sent to a low pass amplifier filter 97 to filter out the high frequency components, i.e. those components at a frequency of $f_0+f_1$, and to leave the signal as shown in FIG. 8.

The second signal $f_1$ will typically have a frequency that differs from $f_0$ by not more than 25% of the original frequency $f_0$ and especially not more than 10% of the original frequency so that the components of the resulting signal having a frequency $f_0-f_1$ will be at a much lower frequency than any other components of the signal and the higher frequency components can easily be removed by means of an analogue filter. The filtered signal may then be input to a band pass filter amplifier 99 having a pass band centred at $f_0-f_1$ after which a generally sinusoidal third signal 120 is formed as shown in FIG. 8. As shown, the resulting signal, which has been formed by mixing the sensed signal with a second signal having a frequency of 95% of the frequency of the original signal, has a frequency of about 50 kHz, corresponding to a period of 20 microseconds, and is therefore relatively easy to process using relatively simple and inexpensive circuitry. FIG. 8 also shows a corresponding reference signal 122 at the same frequency which has not been subject to any phase shift.

The resulting signal 120 can be represented mathematically as $$\cos[(\omega_0-\omega_1)t - 2\pi x/L]$$

and thus has a phase angle that is proportional to the distance x of the resonator along the excitation winding. The signal is then input to a comparator 101 which converts it to a square wave signal 124 as shown in FIG. 9 whose rising and falling edges correspond with the zero crossing points of the sinusoidal signal 120 of FIG. 8. The resulting square wave signal 115 as shown in FIG. 11D is input into a timer 104 together with another square wave signal $V_{ref}$ generated either by the digital signal generator or directly by the microprocessor 41. The signal $V_{ref}$ has the same frequency as the square wave signal 115, and has an arbitrary zero phase against which the phase of the sensed signal is compared.

The output of the timer 104 is noted and stored by a processing unit 108, following which the position of the resonator, which is related to the value generated by the timer 104 is displayed by means of the display controller 110.

FIG. 10 shows the analogue signal processing components in more detail. As shown, one end of the sense coil 11 is connected between two resistors R1 and R2 which are connected in series between the supply voltage and "true" ground to set an acting ground voltage level $V_{AG}$. In particular, in this embodiment the supply voltage is 5V and the resistance of resistor R1 is equal to the resistance of resistor R2 to give an acting ground voltage level of 2.5V. The inputs +I and −I to the mixes are generated by the signal generators at frequency $f_1$.

Figure 11A:
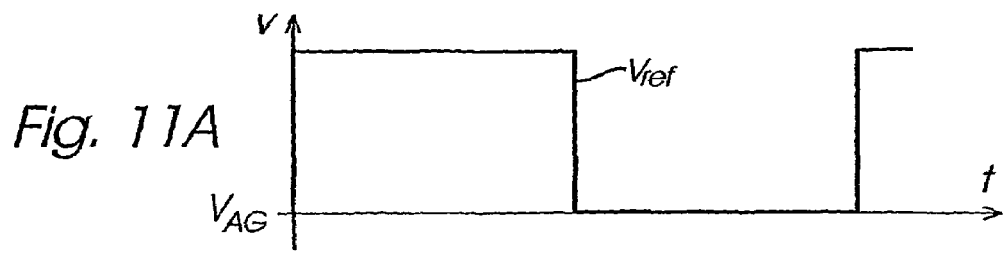
Figure 11B:
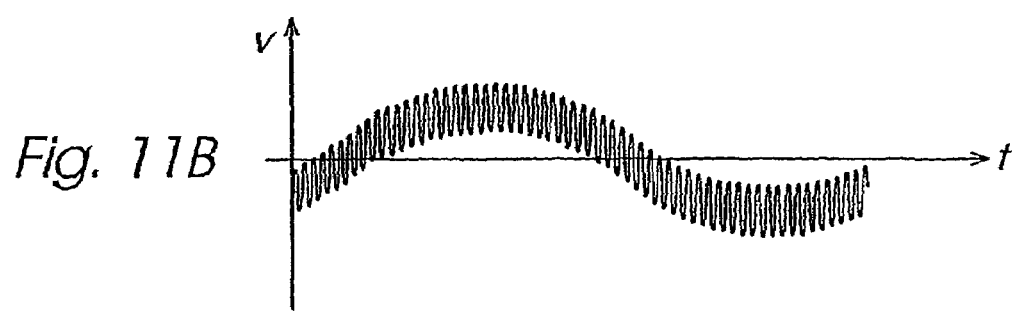
Figure 11C:
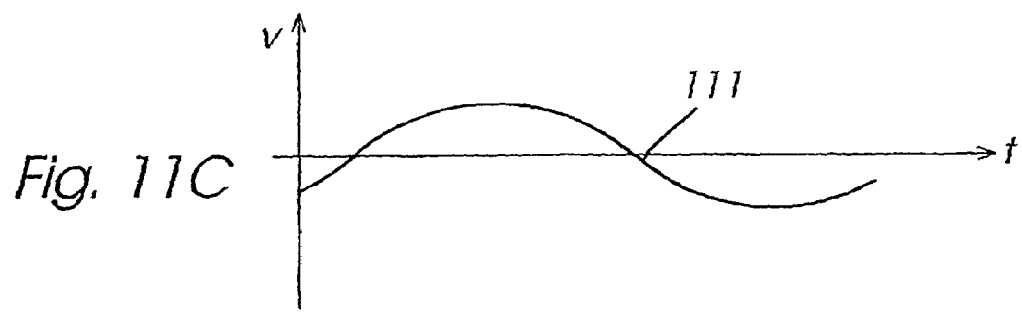
Figure 11D:
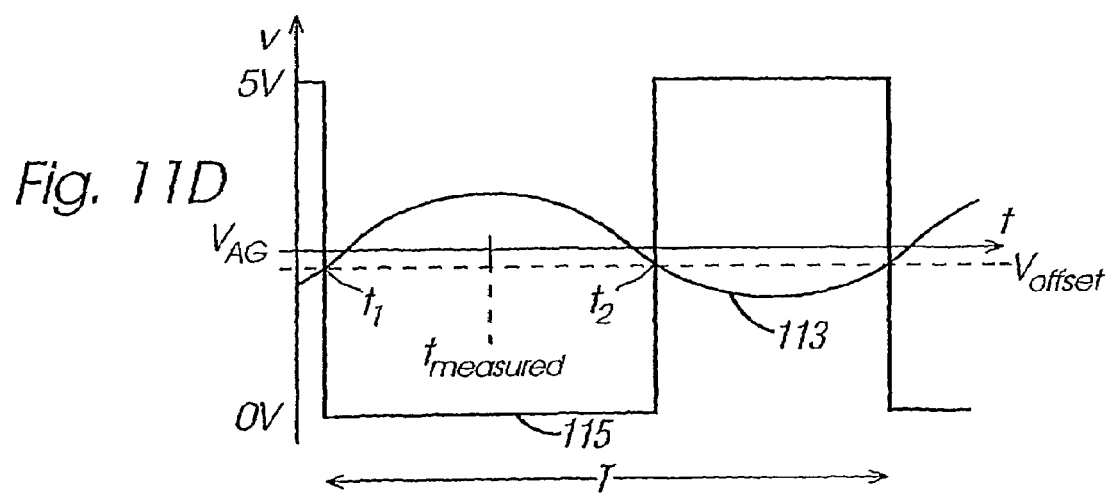

FIG. 11A shows the synchronisation signal $V_{ref}$ sent from the signal generator to the timer 104 while FIGS. 11B and 11C show the sensed signal before and after filtering. The resulting signal may have a D.C. offset depending on the filtering by filters 95, 97 and 99.

FIG. 11D shows the filtered signal 113 together with the square wave signal 115 output by the comparator 101.

In this embodiment, the comparator 101 is an inverting comparator whose output is high (i.e. 5V) when the signal 113 output from the band pass filter amplifier 99 is below a reference voltage level, and whose output is low (i.e. 0V) when the signal 113 output from the band pass filter amplifier is above the reference voltage level. As can be seen from FIG. 11D, the reference voltage level $V_{offset}$ is not the acting ground voltage level $V_{AG}$, but rather a voltage below the acting ground voltage level $V_{AG}$ and the true ground. This prevents the comparator 101 from generating spurious signals when there is no output from the band pass filter amplifier 99 except for a small amount of noise. However, this also means that the leading and trailing edges of the signal output by the comparator 101 do not coincide with the points where the signal 113 output by the band pass filter amplifier 99 crosses the acting ground voltage level $V_{AG}$. To avoid this introducing a phase error, the timing of the signal 115 output by the comparator 101 is determined from timing of the midpoint between a trailing edge and a leading edge. In particular, if as shown in FIG. 11D the trailing edge is at a time $T_1$ and the leading edge is at a time $t_2$, then the measured time corresponds to $(t_1+t_2)/2$.

FIG. 12 is a flow diagram showing the steps for determining the position of the resonator. Initially, in step S1, the processing unit 108 sends a control signal to the signal generator 42 which responds by outputting the quadrature signal Q(t) and the in-phase signal I(t) to the coil drivers 83 and 85 for the cos coil 9 and the sine coil 7 respectively. The processing unit 108 then measures in step S3 the phase angle between the digitised low frequency signal from the comparator 101 and the reference signal $V_{ref}$, which will hereafter be termed the forward angle.

FIG. 13 shows the main steps performed to measure the forward angle. Firstly, the processing unit 108 identifies, in step S21, the time corresponding to when the signal 113 output by the band pass filter amplifier 99 crosses the reference voltage $V_{offset}$ in a positive direction. Next, the processing unit 108 identifies, in step S23, the time corresponding to when the signal 113 output by the band pass filter amplifier 99 crosses the reference voltage $V_{offset}$ in a negative direction.

After measuring the forward angle, the processing unit 108 sends a control signal to the signal generator 42 which responds by outputting the cosine signal and the minus sine signal so that the quadrature signal Q(t) and the anti-phase sine signal −I(t) are applied to the cosine coil 9 and the sine coil 7 respectively. The processing unit 108 then measures, in step S7 the reverse phase angle between the digitised low frequency signal from the comparator 101 and the reference signal $V_{ref}$ which will hereafter be referred to as the reverse angle.

The processing unit 108 then determines in step S25, if the time $t_1$ is greater than time $t_2$, which may occur depending on the phase difference between signal 115 and $V_{ref}$. If it is determined that time $t_1$ is greater than $t_2$, then the processing unit adds in step S27, half the period T of the signal to the value of $t_2$. The processing unit then sets the forward angle which corresponds to the timing from the beginning of a frame to the midpoint of $t_1$ and $t_2$ by averaging the time.

The processing unit then checks in step S31 if the forward angle is greater than 360°, which can happen depending on the timing of the signal 115, and if so, subtracts 360° from the forward angle.

FIG. 14 shows the main steps performed to measure the reverse angle. Firstly the processing unit determines the time $t_1$ of the positive zero crossing pulse in step S41 and the negative zero crossing pulse in step S43. The processing unit then determines in step S45 if $t_1$ is greater than $t_2$ and, if so, adds, in step S47, half the period T to $t_2$.

The processing unit then sets in step S49, the reverse angle which corresponds to the timing from the end of a frame to the midpoint of $t_1$ and $t_2$. The processing unit 108 then checks, in step S51 if the reverse angle is less than 0° and if so, adds 360° to it in step S53.

The processing unit 108 then averages, in step S9, the forward and reverse angles, which as discussed above removes the fixed phase shift $\phi_{RC}$ introduced by the resonant circuit and any other phase errors from electronics and processing components within the sensor element 1 to give an average angle representative of the position of the sensor element 1. The processing unit 108 then converts, in step S11, the average angle into a position value by multiplying the average angle by a scaling factor. The position value is then displayed on the display 15.

MODIFICATIONS AND FURTHER EMBODIMENTS

As described above, the phase shift $\phi_{RC}$ introduced by the resonator circuit in the sensor element 1 is removed by effectively taking two measurements of the position with the amplitude of the signal applied to the sine coil 7 being reversed between measurements. It will be appreciated that in alternative embodiments, the reverse measurement need only be performed intermittently to determine a value for the phase shift $\phi_{RC}$ which must be subtracted from the forward angle. This has the advantage of increasing the measurement update rate. Alternatively, a predetermined value for the phase shift $\phi_{RC}$, determined by a factory calibration, could be subtracted from a single phase measurement. However, this latter alternative is not preferred because it cannot allow for environmental factors which affect the resonant frequency $f_{res}$ and quality factor of the resonant circuit and therefore vary the phase shift $\phi_{RC}$.

It will be appreciated that if the reverse angle is subtracted from, rather than added to, the forward angle then the position-dependent phase shift $\phi(x)$ would be removed to leave a value equal to twice the phase shift $\phi_{RC}$. As the phase shift $\phi_{RC}$ varies with environmental factors, a measurement of the phase shift $\phi_{RC}$ can be indicative of an environmental factor. Therefore the described inductive sensor could also be used as, for example, a temperature sensor or a humidity sensor. Typically, this would involve storing in the control circuitry of the inductive sensor a factory calibration between the measured phase shift $\phi_{RC}$ and the corresponding value of the environmental factor.

In an embodiment of the invention, the described inductive sensor is used to detect remotely the temperature of a liquid within a vessel. In particular, the sensor element 1 is placed within the vessel so that it is immersed in the liquid while the sine coil 7, cosine coil 9 and sense coil 11 are positioned adjacent the exterior of the vessel. The forward and reverse angles are calculated as described, and then subtracted to give a value representative of the phase shift $\phi_{RC}$. The processing unit 108 then accesses a look-up table storing a factory calibration between the measured phase shift $\phi_{RC}$ and temperature, so that a value of the temperature is obtained. It will also be appreciated that an advantage of using an inductive sensor is that there is no requirement to puncture a hole in the vessel to obtain an electrical signal from the sensor element.

Another application of an inductive sensor according to the invention is to detect the humidity in the exhaust of a clothes drier, which is useful to optimise drying cycles.

It will be appreciated that detection of environmental factors can be performed either instead of or in addition to detecting the relative position of two relatively movable members.

In the described embodiment, the sine coil 7 and cosine coil 9 are arranged so that their relative contributions to the total magnetic field component perpendicular to the PCB 5 vary in accordance with position along the measurement direction. In particular, the sine and cosine coils have an alternate twisted loop structure. However, it would be apparent to a person skilled in the art that an enormous variety of different excitation winding geometries could be employed to form transmit aerials which achieve the objective of causing the relative proportions of the first and second transmit signals appearing in the ultimately detected combined signal to depend upon the position of the sensor element in the measurement direction.

While in the described embodiment, the excitation windings are formed by conductive tracks on a printed circuit board, they could also be provided on a different planar substrate or, if sufficiently rigid, could even be free standing. Further, it is not essential that the excitation windings are planar because, for example, cylindrical windings could also be used with the sensor element moving along the cylindrical axis of the cylindrical winding.

If the inductive sensor is used to measure only an environmental factor such as temperature or humidity, only one transmit aerial could be used as there is no requirement for the phase of the magnetic field to vary with position. Not only temperature and humidity can be measured in this way. For example the system may be employed to measure the position (or presence) of an object whose conductivity, permeability or permittivity affects the resonance of the resonator.

In the above described embodiment, a passive resonator is used. However, in some circumstances it may be advantageous to use a powered resonator so that the signal induced in the resonator is considerably amplified, thus reducing the requirements on the signal processing circuitry. This may be achieved, for example, simply by employing a narrow bandpass filter together with an operational amplifier.

In the described embodiment, the inductive sensor is used to measure the linear position of a first member (i.e. the sensor element 1) relative to a second member (i.e. the PCB 5) in a measurement direction along a straight line. Alternatively, the inductive sensor could be adapted to measure linear position along a curved line, for example a circle (i.e. a rotary position sensor), by varying the layout of the sine coil and the cosine coil in a manner which would be apparent to a person skilled in the art. Thus the sensor could be used to measure angular position by forming the excitation winding with a cylindrical geometry. The inductive sensor could also be used as a speed detector by taking a series of measurements of the position of the first member relative to the second member at known timings. Further, by including additional position sensing devices for sensing the position of the second member relative to a co-ordinate position system (for example, a GPS sensor, an inertial gyroscope, a compass or the like), the position of the first member in the co-ordinate position system can be determined.

In some embodiments, the first member is significantly larger than the resonant circuit. In this case, it can be difficult to identify correctly the movement of the first member. For example, the resonant circuit may move linearly while the movement of the first member includes a rotational component. More precise information about the movement of the first member can be obtained by using two resonator circuits, each having a respective different resonant frequency, attached to respective different positions on the first member. The position of each resonant circuit can be individually measured by tuning the frequency $f_0$ to the resonant frequency for that resonant circuit, and the two positions can be processed to give more precise information on the position and orientation of the first member.

As described above, the inductive sensor can be used to measure environmental parameters in addition to position. In an embodiment, the first sensor includes two co-located resonant circuits having different resonant frequencies, with one resonant circuit including components which are relatively immune to environmental factors so that the resonant frequency is relatively stable, whereas the other resonant circuit has a resonant frequency which varies relatively sharply with environmental factors. In this way, by obtaining a position measurement for each resonant circuit without correcting for the phase shift $\phi_{RC}$, the difference in the position measurements can form a measure of an environmental parameter (for example temperature in a constant humidity environment or humidity in a constant temperature environment). Further, it is not essential for the two resonant circuits to be co-located provided their relative positions in the measurement direction or directions is known.

In order to minimise susceptibility to unwanted noise derived from, for example, an external device, one or more additional loops may be added to the basic structure of the sense coil in order to balance it. Such additional loops are preferably displaced in a direction transverse to the measurement path such that the signal received by the additional loops does not vary with the relative position of the moveable member.

In the above described embodiment, the measurement path extends only over a single period of the spatial variation of the two transmit coils (i.e the sine coil 7 and the cosine coil 9). However, this need not be the case and the measurement path could extend over more or less than a single period of the spatial variation of the transmit coils. In such a case, it is preferable to include a mechanism for resolving period ambiguity (i.e. the fact that the basic phase of the information carrying component of the combined signal will be identical for the same corresponding position in different spatial periods of the transmit coils). Mechanisms for overcoming spatial period ambiguity which can be employed include providing a single reference position detected, for example, by a single location position sensor (e.g. by having a single localised transmit coil transmitting a third transmit signal at a different frequency to add with the excitation winding, or by using an opto-switch) and thereafter counting the periods from the reference position, and maintaining a record in a register within the microprocessor of the particular period within which the sensor element is currently located. Alternatively, an additional excitation winding transmitting at a different frequency (or transmitting in a time multiplexed manner), could be used with either a slightly different spatial frequency to provide a vernier scale effect, or with a widely different spatial frequency to provide coarse position detection using a large scale excitation winding and fine scale position detection using small scale excitation winding.

In the described embodiment, a single resonant circuit is formed on the sensor element 1, and the orientation of the sensor element 1 relative to the sine coil 7, cosine coil 9 and sense coil 11 is fixed. A particular orientation is not essential, although it is preferred that the orientation is fixed or known for consistency of measurement.

In some applications it is desirable not to introduce any constraint on the orientation of the sensor element 1. For example, for a liquid level sensor in which the sensor element floats on top of a liquid (e.g. a liquid level sensor in a container storing detergent or the like), if a constraint is placed on the movement of the sensor element, then the sensor element may become stuck after prolonged use so that it does not provide a true representation of the liquid level. In such an application, preferably the sensor element floats freely on top of the liquid and the sensor element comprises multiple resonant circuits at respective different orientations so that the position of the sensor element can be detected regardless of its orientation. If desired, the resonant frequency for each of the resonant circuits can be made different so that the orientation of the sensor element can also be detected by scanning through all the possible resonant frequencies and measuring the strengths and/or phases of the received signals.

An advantage of the described embodiment is that the digital processing required to determine the position of the sensing element is so straightforward that it can be performed by a short piece of code run by a conventional microprocessor chip. It is therefore not necessary to develop an application specific integrated circuit (ASIC), which is a notoriously difficult and time consuming task. It will be appreciated that a dedicated microprocessor is not required, so that a microprocessor which performs additional functions, for example controlling a domestic appliance, could be used.

In the described embodiment, a frequency of 1 MHz is used. Using a higher frequency facilitates making the sensor element small. However, in some applications it may be desirable to use a frequency below 100 kHz, for example if a sheet of stainless steel separates the sensor element from the excitation and sensor windings, because the skin depth of the stainless steel is greater at lower frequencies.

In the described embodiment, the excitation windings (i.e. the sine coil 7 and the cosine coil 9) are electromagnetically coupled to the sensor winding (i.e. the sense coil 11) via a resonant circuit. Alternatively, the excitation windings could be coupled to the sensor winding via a permeable or conductive element or a harmonic element (such as a magnetorestrictive element which generates signals at harmonics of an excitation signal). Further, it is not essential to use an intermediate coupling component between the excitation and sensor windings as either the sensor winding or the excitation winding could be formed on the movable part, although this is not preferred because it would require electrical connections to be made to the movable part. In an embodiment, the sensor winding forms part of a resonant circuit on the movable part.

As described above only a single resonant circuit is employed. However, it is possible to employ one or more resonant circuits having any of a number of different resonant frequencies in order to identify a particular resonator. In addition or alternatively, the orientation of the resonator may be employed in order to identify it. The resonator frequency and/or orientation may be set by a user or, for example by an equipment manufacturer. Thus, for example, sub-components of equipment, e.g. a fascia panel may incorporate a resonator of predetermined resonant frequency and/or orientation in order to identify the sub-component in question by interrogation by the equipment. Alternatively, resonators having different resonant frequencies may be employed where more than one resonator is present. For example resonators may be excited by the excitation winding in turn in order to determine a parameter value from them. Where the orientation of the resonator is to be determined, the excitation and/or sensor winding may have cylindrical geometry if desired.

The invention claimed is:

1. A sensor for sensing a parameter, the sensor comprising:
    (i) an excitation winding comprising a plurality of coils having different spatial functions;
    (ii) a signal generator operable to generate excitation signals and arranged to apply the generated excitation signals to the excitation coils;
    (iii) a sense coil that can be electromagnetically coupled to the excitation winding such that, in response to an excitation signal being applied to the excitation winding by the signal generator, there is generated in the sense coil a periodic electric signal having a phase that is indicative of the value of the parameter to be measured by the sensor; and
    (iv) a signal processor operable to process the periodic electric signal generated in the sense coil to determine a value representative of the parameter being measured;
    wherein the signal processor is operable to generate a second signal at a frequency that differs from that of the excitation signal only by a small amount, and to mix the second signal with the signal received from the sense coil to generate a third signal having a frequency component equal to the difference between the frequency of the excitation signal and that of the second signal, and to determine the said value from the phase of the third signal.

2. A sensor as claimed in claim 1, wherein the sensor winding can be electromagnetically coupled to the excitation winding via an intermediate device.

3. A sensor as claimed in claim 2 wherein the intermediate device comprises an object of defined permeability or permittivity.

4. A sensor as claimed in claim 2, wherein the intermediate device comprises a resonator having a resonant frequency substantially equal to the frequency of the excitation signal.

5. A sensor as claimed in claim 4, wherein the resonator comprises a passive LC circuit.

6. A sensor as claimed in claim 4, wherein the resonator has a quality factor of at least 10.

7. A sensor as claimed in claim 4, wherein the signal generator is operable periodically to generate an excitation signal having a frequency different from the resonant frequency of the resonator in order for the sensor to determine background noise picked up by the sensor coil.

8. A sensor as claimed in claim 2, wherein the parameter that is determined is orientation of the intermediate device.

9. A sensor as claimed in claim 2, wherein the parameter that is determined is temperature.

10. A sensor as claimed in claim 2, wherein the parameter that is determined is humidity.

11. A sensor as claimed in claim 2, which includes at least two excitation windings and/or sense coils in order to determine the position of the intermediate device in two or more dimensions.

12. A sensor as claimed in claim 11, which includes at least three excitation windings and/or sense coils in order to determine the position of the resonator in three dimensions.

13. A sensor as claimed in claim 2, wherein the parameter that is determined is the position of the intermediate device in one or more dimensions.

14. A sensor as claimed in claim 1, wherein the or each excitation winding comprises a coil or coils having plurality of loops arranged so that current flowing through the excitation winding flows around one loop in an opposite direction to the flow of current around the or at least one other loop.

15. A sensor as claimed in claim 1, wherein the or each excitation winding comprises a pair of coils that are arranged in space quadrature so that the same current flowing in each coil will produce magnetic fields in quadrature relationship.

16. A sensor as claimed in claim 14, wherein one coil of the or each excitation winding is arranged to produce a magnetic field one component of which has a magnitude that varies as the sine of the distance from a reference point, while the other coil of the or each excitation winding is arranged to produce a magnetic field component in the same direction whose magnitude varies as the cosine of the distance from the reference point.

17. A sensor as claimed in claim 1, wherein the difference between the frequency of the excitation signal and that of the second signal is not more than 30% of the frequency of the excitation signal.

18. A sensor as claimed in claim 17, wherein the difference between the frequency of the excitation signal and that of the second signal is not more than 10% of that of the second signal.

19. A sensor as claimed in claim 1, wherein the excitation signal comprises a pair of oscillating signals that are in time quadrature, each of which is applied to one of the coils.

20. A sensor as claimed in claim 19, wherein the signal generator is operable to invert one of the oscillating signals, and the signal processor is operable to determine the value of the parameter by processing quantities determined from both the inverted and non-inverted oscillating signals.

21. A sensor as claimed in claim 1, wherein the signal processor includes a filter to remove components of the third signal having frequencies higher than the difference between the frequency of the excitation signal and that of the second signal.

22. A sensor as claimed in claim 1, wherein the signal processor is operable to generate a reference signal at a frequency equal to that of the said frequency component of the third signal against which the phase of the third signal is referred in order to determine the value of the parameter to be determined.

23. A sensor as claimed in claim 22, wherein the signal processor includes a comparator that determines the cross-over point of the third signal and a comparator that determines the cross-over point of the reference signal, and includes a timer to measure the phase difference between the third signal, and the reference signal.

24. A sensor as claimed in claim 1, wherein the signal processor includes a comparator that determines the cross-over point of the third signal.

25. A sensor as claimed in claim 1, wherein the excitation windings and sense coil are generally co-planar.

26. A sensor as claimed in claim 1, wherein the signal generator is operable to generate a digital excitation signal.

27. A sensor as claimed claim 1, wherein the excitation signal has a frequency of at least 100 kHz.

28. A sensor as claimed in claim 1, wherein the said frequency component of the third signal is in the range of from 100Hz to 100kHz.

29. A sensor as claimed in claim 1, which includes means for storing calibration data for converting the phase of the third signal into a measurement value for the parameter.

* * * * *